United States Patent Office 3,297,643
Patented Jan. 10, 1967

3,297,643
POLYMERIC RESIN OF DIISOCYANATE AND PENTAERYTHRITOL-ACROLEIN CONDENSATE
John Gagliani, Wilmington, Del., assignor to Delaware Chemicals, Inc., Wilmington, Del., a corporation of Delaware
No Drawing. Filed Dec. 28, 1962, Ser. No. 247,858
10 Claims. (Cl. 260—67)

The present invention relates to a process for reacting a diisocyanate with an unsaturated polyhydric alcohol resulting from the reaction of pentaerythritol with an alpha-beta unsaturated aldehyde and to the products derived therefrom. More specifically, this invention relates to a process for reacting toluene diisocyanate with a condensate resulting from the reaction of pentaerythritol with acrolein and to the products derived therefrom.

Pentaerythritol reacts with acrolein to form cyclic acetals capable of further reaction by the addition of the unreacted hydroxyl groups of the pentaerythritol with the unsaturated portion of the acetal. The resinous products so obtained have been found to have many desirable properties. They are clear, nearly colorless thermoplastic resins which surpass the polyesters and acrylic polymers in mechanical strength and have electrical properties approaching those of the polystyrenes.

One of the most serious deficiencies of these products is their sensitivity to water. They will imbibe minute quantities of water which will cause decomposition (hydrolysis) of the cyclic acetal linkages resulting in the disintegration of the polymer. This characteristic is best demonstrated by imersing a cured 3 mil film of the resin on a steel panel in a dilute detergent solution. The film will be destroyed in a relatively short time—less than 2 hours.

It is thus a principal object of the present invention to provide an improved modified resin of polycondensed pentaerythritol and alpha-beta unsaturated aldehydes and a method of producing the same.

Another object of the present invention is to provide an improved modified resin of polycondensed pentaerythritol and alpha-beta unsaturated aldehydes characterized by its high stability in the presence of water.

Still another object of this invention is to provide a process for reacting a diisocyanate with a product resulting from the reaction of pentaerythritol and alpha-beta unsaturated aldehydes and products derived therefrom.

A further object of this invention is to provide a process for reacting toluene diisocyanate with a product resulting from the reaction of pentaerythritol and acrolein and products derived therefrom.

Still a further object of this invention is to provide new diisocyanate modified pentaerythritol-acrolein polymers for use as surface coating on various substrates as wood, steel, aluminum, etc.; as a molding compound either alone or with inert fillers and as imbedding, potting and casting compounds.

Further objects and the entire scope of applicability of this invention will become apparent from the detailed descriptions given hereinafter. It should be understood, however, that the detailed description and specific examples while indicating preferred embodiments of this invention, are given only by way of illustration. Various changes and modifications within the spirit and scope of this invention will become apparent from the detailed description, to those skilled in the art.

In a sense the present invention contemplates the provision of a polymeric resin comprising a polycondensate of pentaerythritol, an alpha-beta unsaturated aldehyde and a diisocyanate. The molar ratio of the pentaerythritol to the alpha-beta unsaturated aldehyde is advantageously between 1.40:2 and 1.70:2 and the weight ratio of the pentaerythritol-unsaturated aldehyde resin to toluene diisocyanate is advantageously between 1:0.10 and 1:0.65. The resin may be in the form of a curable liquid and thus advantageously contains a Lewis acid catalyst and a heat deactivated catalyst blocking agent.

In preparing the improved resin in accordance with the present process an A stage resin or precondensate is prepared by reacting pentaerythritol and an alpha-beta unsaturated aldehyde in the presence of an acid catalyst, such as phosphoric acid, at an elevated temperature until a predetermined viscosity is reached, preferably between 2200 and 2500 centipoises (Z and Z8 on Gardner-Holdt) at 100% solids at 20° C. The A stage resin is then admixed with a Lewis acid catalyst and advantageously an inert solvent and maintained for a predetermined time at a predetermined temperature to effect polycondensation until a predetermined viscosity is reached, advantageously between 200 and 2200 centipoises (H and Z on Gardner-Holdt) at 50% solids at 20° C. In addition, the unmodified B stage resin advantageously has an unreacted hydroxyl content of between 9.0% and 15.0%. The polycondensate or B stage resin is cooled and a heat deactivatable catalyst blocking agent is admixed with the resin. The B stage resin is then admixed with the diisocyanate at a temperature below the blocking agent deactivating temperature, advantageously at a temperature between about 5 and 50° C. to produce the improved modified resin. The curing time and pot life decreases with increases in temperature. The ratios of the pentaerythritol to alpha-beta unsaturated aldehyde to diisocyanate is as set forth above.

Among the alpha-beta unsaturated aldehydes which may be employed are acrolein, methacrolein, croton aldehyde and others. While the toluene diisocyanates have been advantageously employed other diisocyanates may be used, such as polymethylene polyphenyl diisocyanate, 3,3-dimethyl-4,4-biphenylene diisocyanate, 3,3-dimethoxy-4,4-biphenylene diisocyanate. Examples of Lewis acid catalysts which may be used in the preparation of the B stage catalyst are diethyl sulfate, alkane sulfonic acid, toluene sulfonic acid, sulfuric acid, methyl toluene sulfonic acid, ethyl toluene sulfonic acid, aluminum chloride, ammonium persulfate, and examples of inert solvents are benzene, ethyl acetate, butyl acetate, butyl formate, ethylene glycol monomethyl ether acetate, ethylene glycol monoethyl ether acetate, ethyl propionate, acetone, methyl isobutyl ketone, tetrachloroethylene. The catalyst blocking agent is advantageously a volatile organic base having a boiling point above 70° C. and is desirably a tertiary cyclic amine, such as pyridine, 2,5-methyl ethyl pyroline, alpha or beta picoline, and others.

In accordance with a preferred form of the present invention the process is carried out by first reacting either pentaerythritol and acrolein or pentaerythritol and diallylidene pentaerythritol in a two step process to yield a stable B stage resin and then mixing the resultant product with a diisocyanate. In the first operation the two components are reacted in the presence of a suitable acid catalyst to produce an A stage liquid precondensate which can be stored indefinitely without appreciable polymerization and then reacting the A stage resin at elevated temperatures with a suitable acid catalyst to yield a B stage resin to which may be added the aforesaid catalyst blocking agent and which possesses from one month to infinite stability. In the second operation the B stage resin is mixed with a diisocyanate in varying ratios to form a product with greatly improved properties.

The B stage resin may be prepared in accordance with this invention with varying ratios of pentaerythritol and acrolein. The following ratios have been satisfactorily prepared.

| Sample | Mols Pentaerythritol | Mols Acrolein |
| --- | --- | --- |
| a | 1.42 | 2 |
| b | 1.45 | 2 |
| c | 1.515 | 2 |
| d | 1.55 | 2 |
| e | 1.60 | 2 |
| f | 1.65 | 2 |

The mol ratio of 1.60 mols of pentaerythritol to 2 mols of acrolein was found to be optimum.

The B stage resin prepared in accordance with this invention may be mixed in various ratios with toluene diisocyanate or other diisocyanates. This solution is put on steel panels in 0.3 mil films and cured at 160±5° C. for 30 minutes.

Films of 0.3 mil thickness produced by coating a steel panel with the following diisocyanate modified B stage resins possess the properties designated in the following table:

| Parts B Stage Resin | Parts Toluene Diisocyanate | Physical Appearance of Film |
| --- | --- | --- |
| 1 | 0.105 | Soft—Flexible. |
| 1 | 0.222 | Do. |
| 1 | 0.344 | Medium—Flexible. |
| 1 | 0.50 | Tough—Flexible. |
| 1 | 0.62 | Hard—Brittle. |

The following examples are given merely by way of illustration of the present invention.

The detergent stabilities of cured films formed of the present resin compositions are determined by subjecting the film to the following standard detergent solution:

| | Grams |
| --- | --- |
| $Na_4P_2O_4 \cdot 10H_2O$ | 234.8 |
| $Na_2SO_4$ | 50.3 |
| Sodium alky sulfonate | 52.9 |
| Sodium metasilicate—$9H_2O$ | 43.1 |
| Sodium carbonate | 3.1 |
| Water | 26,500.0 |

The time required to effect the disintegration of the film is a measure of its stability. It should be noted that the unmodified resin film had a detergent stability of only about one-half hour.

EXAMPLE 1

A. *Preparation of A stage resin*

A mixture of 212 grams of diallylidene pentaerythritol (1 mol), 88.5 grams of monopentaerythritol (0.55 mol) and 0.4 milliliter of 85% phosphoric acid were reacted at 142° C. ± 2° C. for 3 hours.

B. *Preparation of the B stage resin*

250 grams of the above A stage resin and 13.3 grams of a 15% solution of diethyl sulfate in acetone are heated at 82° C.±2° C. for one hour. 125 grams of Cellosolve acetate are added and the reaction mixture held at 20° C. ±2° C. for an additional hour. An additional 125 grams of Cellosolve acetate are added and the reaction mixture held at 80° C.±2° C. until a viscosity of S to U (Gardner-Holdt) at 50% solids is obtained. The reaction mixture is cooled and 3.1 milliliters of pyridine is added. The solution is stirred for 10 minutes to insure complete mixing.

C. *Preparation of modified resin*

16 grams of the B stage resin (50% solids) and 4 grams of toluene diisocyanate are mixed together at room temperature. A 3 mil film of the above solution was laid down on a steel panel and cured at 160° C.±5° C. for 30 minutes. The film was tough, flexible, light colored and had a detergent stability of 200 hours.

EXAMPLE 2

A. *Preparation of A stage resin*

Same as in Example 1 except using 212 grams of diallylidene pentaerythritol (1.0 mol) and 61.2 grams of monopentaerythritol (0.45 mol).

B. *Preparation of B stage resin*

Same as in Example 1.

C. *Preparation of modified resin*

16 grams of the B stage resin (50% solids) and 4 grams of toluene diisocyanate are mixed together at room temperature. (The resin solution had a "can" stability of one hour.) A 3 mil film of the above solution was laid down on a steel panel and allowed to cure at room temperature for 3 hours. The film was tough, flexible, light colored and had a detergent stability of over 300 hours.

EXAMPLE 3

A. *Preparation of A stage resin*

Same as in Example 1 except using 212 grams of diallylidene pentaerythritol (1 mol) and 88.5 grams of monopentaerythritol (0.65 mol).

B. *Preparation of B stage resin*

Same as in Example 1.

C. *Preparation of modified resin*

16 grams of the B stage resin (50% solution) and 4 grams of toluene diisocyanate are mixed together at room temperature. A 3 mil film of the above solution was laid down on a steel panel and allowed to cure at room temperature for 30 minutes. The resin solution had a can stability of 15 minutes.

While there have been described the preferred embodiments of the present invention it is apparent that numerous alterations, omissions and additions may be made without departing from the spirit thereof.

What is claimed is:

1. A polymeric resin comprising a polycondensate of pentaerythritol, an alpha-beta unsaturated aldehyde selected from the class consisting of acrolein, methacrolein and croton aldehyde, and an organic diisocyanate selected from the class consisting of toluene diisocyanate, polymethylene diisocyanate, polyphenyl diisocyanate, 3,3-dimethyl-4,4-biphenylene diisocyanate, and 3,3-dimethoxy-4,4-biphenylene diisocyanate, the mol ratio of said pentaerythritol component to said aldehyde component being between 1.4:2.0 and 1.7:2.0, and the weight ratio of said diisocyanate component to said pentaerythritol and aldehyde component being between 0.10:1.0 to 0.65:1.0.

2. A liquid resin according to claim 1 including a Lewis acid catalyst and a volatile organic base having a boiling point above 70° C.

3. A polymeric resin comprising a condensate of pentaerythritol, acrolein and toluene diisocyanate, the mol ratio of the pentaerythritol component to the acrolein component being between 1.4:2.0 and 1.7:2.0, and the weight ratio of said toluene diisocyanate component to said pentaerythritol and acrolein component being between 0.10:1.0 to 0.65:1.0.

4. A liquid resin according to claim 3 including a Lewis acid catalyst and pyridine.

5. The resin of claim 4 wherein said catalyst is diethyl sulfate.

6. The method of improving the properties of a polycondensate resin of pentaerythritol and an alpha-beta unsaturated aldehyde comprising admixing an organic diisocyanate with said resin.

7. The method of claim 6 wherein the weight ratio of said diisocyanate to said resin is between 0.10:1.0 and 0.65:1.0.

8. The method of claim 6 wherein said diisocyanate is toluene diisocyanate.

9. The method of claim 6 wherein said resin contains a Lewis acid catalyst and a volatile organic base having a boiling point above 70° C.

10. The method of claim 6 wherein said resin has a free hydroxyl content of between 9.0 and 15%.

References Cited by the Examiner

UNITED STATES PATENTS

| | | | |
|---|---|---|---|
| 2,755,268 | 7/1956 | Uelzmann | 260—67 |
| 2,961,428 | 11/1960 | Muller et al. | 260—67 |
| 2,970,985 | 2/1961 | Guest et al. | 260—67 |
| 3,054,803 | 9/1962 | Robeson et al. | 260—77.5 XR |
| 3,055,871 | 9/1962 | Heffler et al. | 260—77.5 |
| 3,087,918 | 4/1963 | Guest et al. | 260—67 |
| 3,120,502 | 2/1964 | Merten | 260—77.5 |

FOREIGN PATENTS 1,084,914  7/1960  Germany.

SAMUEL H. BLECH, *Primary Examiner.*

WILLIAM H. SHORT, LOUISE P. QUAST, *Examiners.*

L. M. MILLER, *Assistant Examiner.*